US011353004B2

(12) United States Patent
Beekmann et al.

(10) Patent No.: US 11,353,004 B2
(45) Date of Patent: Jun. 7, 2022

(54) WIND TURBINE COMPRISING A GEARLESS GENERATOR AND A GENERATOR FILTER

(71) Applicant: Wobben Properties GmbH, Aurich (DE)

(72) Inventors: Alfred Beekmann, Wiesmoor (DE); Wojciech Giengiel, Aurich (DE); Simon Schrobsdorff, Eversmeer (DE)

(73) Assignee: Wobben Properties GmbH, Aurich (DE)

( * ) Notice: Subject to any disclaimer, the term of this patent is extended or adjusted under 35 U.S.C. 154(b) by 23 days.

(21) Appl. No.: 16/621,167

(22) PCT Filed: Jun. 7, 2018

(86) PCT No.: PCT/EP2018/064966
§ 371 (c)(1),
(2) Date: Dec. 10, 2019

(87) PCT Pub. No.: WO2018/228904
PCT Pub. Date: Dec. 20, 2018

(65) Prior Publication Data
US 2020/0124023 A1  Apr. 23, 2020

(30) Foreign Application Priority Data

Jun. 13, 2017  (DE) .................... 10 2017 112 958.8

(51) Int. Cl.
*F03D 9/00* (2016.01)
*H02P 9/04* (2006.01)
(Continued)

(52) U.S. Cl.
CPC ............. *F03D 7/0272* (2013.01); *F03D 9/25* (2016.05); *F03D 15/20* (2016.05); *H02P 9/105* (2013.01); *H02P 2101/15* (2015.01)

(58) Field of Classification Search
CPC .......... F03D 7/0272; F03D 9/25; F03D 15/20; H02P 9/105
See application file for complete search history.

(56) References Cited

U.S. PATENT DOCUMENTS 3,896,376 A * 7/1975 Sinniger ................ G01R 31/34
324/765.01
4,439,823 A * 3/1984 Gyugyi .................. H02M 5/272
363/10
(Continued)

FOREIGN PATENT DOCUMENTS

CN    102332728 A    1/2012
CN    103166374 A    6/2013
(Continued)

OTHER PUBLICATIONS

Chen et al., "Wind farm—A power source in future power systems," *Renewable and Sustainable Energy Reviews* 13:1288-1300, 2009.
(Continued)

*Primary Examiner* — Tulsidas C Patel
*Assistant Examiner* — Thomas K Quigley
(74) *Attorney, Agent, or Firm* — Seed Intellectual Property Law Group LLP

(57) ABSTRACT

A method and a wind turbine are provided. The wind turbine includes a gearless generator that is a synchronous generator and includes a stator and a generator rotor. The wind turbine includes a generator filter with modifiable filter properties that is coupled to the stator and configured to filter a stator current. The wind turbine includes a filter controller configured to control the generator filter.

16 Claims, 4 Drawing Sheets

(51) Int. Cl.
  *F03D 7/02* (2006.01)
  *F03D 9/25* (2016.01)
  *F03D 15/20* (2016.01)
  *H02P 9/10* (2006.01)
  *H02P 101/15* (2016.01)

(56) References Cited

U.S. PATENT DOCUMENTS

| | | | | |
|---|---|---|---|---|
| 5,321,598 A * | 6/1994 | Moran | ...... | H02J 3/01 323/207 |
| 5,559,421 A * | 9/1996 | Miyakawa | ...... | H02M 1/12 307/105 |
| 5,798,632 A * | 8/1998 | Muljadi | ...... | F03D 9/25 322/29 |
| 6,433,506 B1 * | 8/2002 | Pavlov | ...... | H02P 21/13 318/799 |
| 6,566,764 B2 * | 5/2003 | Rebsdorf | ...... | H02P 9/42 290/44 |
| 6,784,565 B2 * | 8/2004 | Wall | ...... | H02J 1/10 290/52 |
| 6,787,933 B2 * | 9/2004 | Claude | ...... | H02P 9/04 290/52 |
| 6,856,038 B2 * | 2/2005 | Rebsdorf | ...... | F03D 9/255 290/44 |
| 6,870,279 B2 * | 3/2005 | Gilbreth | ...... | H02J 1/10 290/52 |
| 6,943,462 B2 * | 9/2005 | Wobben | ...... | H02P 9/14 290/44 |
| 7,071,579 B2 * | 7/2006 | Erdman | ...... | F03D 7/0284 290/55 |
| 7,272,026 B2 * | 9/2007 | Chou | ...... | H02M 1/12 323/205 |
| 7,372,174 B2 * | 5/2008 | Jones | ...... | H02P 9/102 290/43 |
| 7,405,490 B2 * | 7/2008 | Moehlenkamp | ...... | F03D 7/0224 290/44 |
| 7,446,511 B2 * | 11/2008 | Wu | ...... | H02J 3/1842 323/207 |
| 7,566,982 B2 | 7/2009 | Voss | | |
| 7,710,081 B2 * | 5/2010 | Saban | ...... | H02K 11/33 322/89 |
| 8,188,610 B2 * | 5/2012 | Scholte-Wassink | ...... | F03D 7/0272 290/44 |
| 8,363,433 B2 * | 1/2013 | Zhang | ...... | H02J 3/01 363/39 |
| 8,513,911 B2 * | 8/2013 | Jones | ...... | B63H 23/24 318/800 |
| 9,035,498 B2 * | 5/2015 | Nielsen | ...... | H02J 3/1821 307/84 |
| 9,293,921 B2 * | 3/2016 | Jones | ...... | H02M 7/493 |
| 9,835,364 B2 * | 12/2017 | Kawashima | ...... | H02M 1/14 |
| 10,270,287 B2 | 4/2019 | Beekmann | | |
| 10,790,668 B1 * | 9/2020 | Gadiraju | ...... | H02J 3/24 |
| 2003/0227172 A1 * | 12/2003 | Erdman | ...... | F03D 7/048 290/44 |
| 2006/0066113 A1 * | 3/2006 | Ebrahim | ...... | H02P 9/04 290/52 |
| 2007/0121354 A1 * | 5/2007 | Jones | ...... | H02M 5/4585 363/47 |
| 2011/0019443 A1 * | 1/2011 | Arnaltes | ...... | H02J 3/1814 363/44 |
| 2011/0057444 A1 * | 3/2011 | Dai | ...... | H02J 3/381 290/44 |
| 2012/0104756 A1 * | 5/2012 | Beekmann | ...... | F03D 7/0272 290/44 |
| 2014/0111001 A1 * | 4/2014 | Miliani | ...... | H02P 21/00 307/9.1 |
| 2014/0217730 A1 * | 8/2014 | Styhm | ...... | F03D 7/04 290/44 |
| 2015/0124496 A1 * | 5/2015 | Yu | ...... | F03D 9/255 363/35 |
| 2015/0308412 A1 * | 10/2015 | Zagrodnik | ...... | H02M 7/003 290/44 |
| 2016/0322924 A1 * | 11/2016 | Oriol | ...... | H02P 9/105 |
| 2016/0329714 A1 * | 11/2016 | Li | ...... | H02J 3/381 |
| 2016/0336834 A1 | 11/2016 | Diedrichs | | |
| 2018/0069499 A1 | 3/2018 | Engelken et al. | | |
| 2018/0159453 A1 * | 6/2018 | Andersen | ...... | H02P 9/007 |
| 2018/0323618 A1 * | 11/2018 | Wagoner | ...... | H02J 3/18 |
| 2019/0140569 A1 * | 5/2019 | Schnetzka | ...... | H02M 1/126 |
| 2019/0140571 A1 * | 5/2019 | Freire | ...... | H02M 1/12 |

FOREIGN PATENT DOCUMENTS

| | | |
|---|---|---|
| DE | 10011750 A1 | 9/2001 |
| DE | 10130339 A1 | 1/2003 |
| DE | 102014200947 A1 | 8/2015 |
| DE | 102014206703 A1 | 10/2015 |
| DE | 102015205348 A1 | 9/2016 |
| EP | 2869458 A1 | 5/2015 |
| RU | 2350778 C2 | 3/2009 |
| WO | 2016120260 A1 | 8/2016 |

OTHER PUBLICATIONS

Melicio et al., "Simulation of Wind Power Generation with Fractional Controllers: Harmonics Analysis," XIX International Conference on Electrical Machines—ICEM 2010, Rome, 5 pages.

* cited by examiner

WIND TURBINE COMPRISING A GEARLESS GENERATOR AND A GENERATOR FILTER

BACKGROUND

Technical Field

The present invention relates to a wind turbine having a gearless generator and a generator filter coupled thereto. The present invention also relates to such a generator filter and the present invention relates to a method for controlling a gearless wind turbine.

Description of the Related Art

Wind turbines are known, and many modern wind turbines have a gearless generator. In this case, the generator has a generator rotor which is directly driven by an aerodynamic rotor. The generator rotor then rotates relative to a stator of the gearless generator, as a result of which current is generated in the stator. This current generated in the stator is then accordingly converted for further use, in particular specifically for feeding into an electrical supply network.

In the case of such a gearless configuration, the generator rotor rotates relatively slowly, for example at less than 20 rpm, while conventional generators or electrical machines often have nominal speeds of 1500 or 3000 rpm.

In this case, such a slowly rotating generator can also result in vibrations or vibration excitations in the nacelle of the wind turbine. In principle, there are specific properties in any type of generator which can produce excitations in the region of the nacelle. Depending on the form, these may result in problems with sound emissions, in which case such problems with sound emissions also depend on the installation location and the rules which are applicable there.

Noise effects can occur in the frequency ranges of 10 Hz to 120 Hz, for example.

In order to counteract such noise emissions, sound insulation may be provided, for example, or vibration decoupling between the nacelle housing and the machine carrier comes into consideration. The published patent application DE 10 2014 206 703 A1 shows a decoupling means for attachment between a carrying module or a nacelle casing and a machine carrier in order to establish an elastically damped connection to the machine carrier thereby.

There are also solution approaches which make the generator quieter overall. Such a solution is proposed in the published patent application DE 10 2014 200 947 A1. There, a stator is proposed for the generator, which stator is divided into stator segments in the circumferential direction, and wherein at least two stator segments are offset or crossed with respect to one another in the circumferential direction. However, such a solution presupposes a corresponding structural change to the generator, which, in this respect, more likely appears to be efficient for the design of a new generator.

The German Patent and Trademark Office carried out a search in respect of the following prior art in the priority application for the present application: DE 100 11 750 A1; DE 101 30 339 A1; De 10 2014 200 947 A1; DE 10 2014 206 703 A1; DE 10 2015 205 348 A1 and EP 2 869 458 A1.

BRIEF SUMMARY

Provided herein are techniques for reducing a sound of a wind turbine, caused by the generator, enabling at least a comparatively quietly running generator or contributing to quiet running.

A wind turbine is provided. This wind turbine comprises a gearless generator which is in the form of a synchronous generator. This synchronous generator has a stator and a generator rotor. The generator rotor denotes the rotating part of the generator and the term "generator rotor" is used here, in particular, in order to avoid any confusion with the aerodynamic rotor of the wind turbine. In this respect, the use of the term "generator rotor" should not be understood as being restrictive to a specific type of generator. In this respect, a gearless generator should be understood as meaning the fact that there is no gear mechanism between the generator and the aerodynamic rotor. In this respect, reference can also be made to a gearless wind turbine. Such a gearless generator runs slowly because it rotates at the same speed as the aerodynamic rotor of the wind turbine. Its speed is below 20 rpm, in particular below 15 rpm, particularly preferably below 10 rpm. This slow speed also affects any vibrations to be expected or reduced. Generators with a gear mechanism typically run at speeds of 3000 rpm or 1500 rpm.

The synchronous generator is preferably in the form of a ring generator in which the magnetically active elements both of the stator and of the generator rotor are arranged in an annular manner around the axis of rotation of the generator in such a manner that no magnetically active elements of the generator are arranged in an inner region of the generator of at least 0 to 50 percent of the air gap diameter. The generator rotor and the stator, apart from carrying structures, are therefore arranged in a substantially annular manner in the region of the air gap.

A generator filter is coupled to the stator in order to filter a stator current. In particular, a partial filter is provided for each three-phase stator current, wherein all partial filters together substantially form the generator filter. In this case, all partial filters are controlled partial filters and can be controlled together via the filter controller or can each be controlled via a partial filter controller. All partial filter controllers can together substantially form the filter controller. Any properties which are described for the generator filter should also analogously apply to each partial filter. Each partial filter can therefore also be considered to be an independent controllable generator filter which filters a stator current.

It is proposed that this generator filter has modifiable filter properties.

A filter controller for controlling the generator filter is also provided. The generator filter can therefore be controlled via the filter controller and can thereby change its filter properties.

As a result, the stator current can be influenced, in particular with regard to harmonics. It has been recognized that such harmonics can result in corresponding noises in the generator. It has also been recognized that, depending on the type, in particular depending on the frequency and amplitude of such noise, this can also be amplified by elements of the wind turbine. This may result in such noises being able to be amplified and, in particular, being able to be emitted by a nacelle casing, including the spinner, and/or rotor blades.

Controlling the generator filter and therefore controlling or changing current harmonics makes it possible to change the latter in such a manner that the resulting noise development also changes. Sometimes, a reduction in a harmonic of one order may suffice here, or harmonics of a plurality of orders are reduced or changed.

In particular in the case of a variable-speed wind turbine which is proposed here, in particular, such current harmonics can change depending on the operating state of the wind turbine. It is possible to dynamically react to these by controllably changing the generator filter. The solution is therefore also particularly flexible and adaptable.

It has also been recognized that noise development may also be an indicator of a non-optimum stator current or a generator operating in a non-optimum manner in another way. The operating behavior of the generator can therefore also be improved using measures for reducing the noises by changing the generator current.

One embodiment proposes that the generator filter has a filter section having controllable capacitive properties or has capacitive properties which are controllable in another manner for changing its filter property. Therefore, it is proposed that the controllability of the generator filter is at least partially achieved by virtue of the fact that capacitive properties are controlled. This may mean that a capacitor or a capacitor bank is changed by connecting or disconnecting capacitors or parts of the latter. However, such a change of capacitors is mentioned here for illustration, in particular. Rather, capacitances or capacitive properties can be influenced by controlling semiconductor components. It also comes into consideration, in particular, that the generator filter behaves like such capacitances. For this purpose, the generator filter actively controls the stator current, for example, specifically as if the generator filter had capacitive properties. The capacitive property can also be controlled thereby by changing the controller.

One embodiment proposes that the generator filter actively influences the stator current, in particular in such a manner that a current signal is impressed on the stator current by the active generator filter. The stator current can be deliberately influenced by such active or direct influencing of the stator current and such influencing can at least partially develop an effect, such as that which results from a passive filter with capacitances or capacitive properties. A change in this impression of the current signal on the stator current then has an effect as if the property of an equivalently passive filter changes. This also thus makes it possible to change or set a capacitive property of the generator filter.

One embodiment proposes that the generator filter is in the form of a converter or an inverter or comprises a converter or an inverter. If the generator filter operates as a converter, it can convert the stator current or part of the latter into another alternating current or can generate a current which can be superimposed on the stator current. In this case, only a small part of the stator current or of the stator voltage is intended to be converted, namely the harmonic components. The converter then operates in such a manner that, on the basis of the available stator current and the desired stator current, it generates a corresponding current signal provided with corresponding harmonics and superimposes it on the stator current, which is also referred to as impression here. As a result, the stator current can be influenced in the desired manner.

Instead of a converter, it is also possible to use an inverter which, unlike the converter, proceeding from a DC voltage on the input side. The DC voltage can be obtained by rectifying the stator current. For this purpose, it comes into consideration, in particular, that the stator current is rectified anyway for further processing in order to feed a DC voltage intermediate circuit. Such an inverter for influencing the stator current can also be supplied with DC voltage from this DC voltage intermediate circuit. Such an inverter or converter can also be controlled in such a manner that it behaves in an equivalent way to an equivalent passive filter and can be controlled in such a manner that it changes the type of current impression such that this corresponds to a change caused by an equivalent passive filter.

The wind turbine is preferably characterized in that the generator filter is arranged between the stator and a rectifier for rectifying the stator current, and optionally the generator filter has capacitances connected in series, with the result that the stator current from the stator flows through the capacitances to a downstream rectifier, or in that the generator filter is configured to emulate such capacitances connected in series.

A structure in which a rectifier is provided, and wherein the generator filter is provided between the stator and the rectifier, is generally proposed. The stator current can therefore be rectified and the resulting direct current or the resulting DC voltage can be provided at a common DC voltage intermediate circuit and can then be processed further. In particular, a downstream inverter can then generate an alternating current for feeding in. The direct current and the DC voltage can also be improved by means of the generator filter.

It has been recognized that undesirable compensation currents, as can arise in filters with capacitances, that is to say capacitors, connected in parallel, are avoided in this case by means of a series circuit of capacitors. However, very large and powerful capacitors are required for such a series circuit. The implementation may be complicated, in particular if said capacitors are variable. It is nevertheless possible and is proposed as a variant. The series circuit of the capacitors should be understood here as meaning that at least one capacitor is provided in each stator current winding phase. If there is therefore a three-phase stator current, there are three stator current winding phases, namely one for each phase. Each stator current winding phase leads from the stator to the rectifier. Therefore, there are then three current winding phases and a capacitor is present in each current winding phase, with the result that the stator current flows along the stator current winding phase through the capacitor, which is naturally possible only for alternating current.

However, it is preferably proposed to emulate such a series circuit of capacitors by means of the generator filter. For this purpose, the generator filter may be in the form of a converter or an inverter or may comprise and use a converter or an inverter for this purpose. Each partial filter is preferably formed by a converter or an inverter or has at least one converter or inverter. It is therefore proposed that the generator filter actively controls the stator current and imposes on it a behavior corresponding to a connection in which a described series circuit of capacitors is present. This possibly makes it possible to dispense with those capacitors which would be required for an arrangement in the series circuit. At the same time, controllability, namely of the emulated capacitors, is more easily possible.

One embodiment proposes that the generator filter is controlled in such a manner that the stator current is changed in such a manner that it results in a higher output power in the generator, which can be achieved, in particular, by means of capacitive properties of the generator filter. The generator is fundamentally excited by means of a direct current in the generator rotor. This is at least one preferred embodiment of the gearless generator used. A stator current is generated as a result and by the rotation of the generator. In particular if the stator current has a capacitive reactive current component, this can reduce a voltage in the generator, namely, in particular, at an inductance in the stator of the generator. As a result, a higher output voltage can be achieved for the same stator active current, namely at the output terminals of the stator, in particular. The result of this is that a higher power can be output, that is to say that the output power of the generator, namely, in particular, the output power at the stator, that is to say at stator terminals, is increased.

This can be achieved, in particular, by means of capacitive filter properties which can generate a capacitive reactive current component.

Another configuration proposes that the generator filter is designed or operated to filter the stator current in such a manner that mechanical vibration excitations of the generator are reduced. Vibration frequencies of a generator are frequently known and, as a result, it is known what type of mechanical vibration excitations of the generator can be expected. It is proposed to accordingly filter the stator current such that such mechanical vibration excitations are reduced.

In particular, the generator filter can be designed for a frequency range or operated in order to filter the stator current in such a manner that the mechanical vibration excitations of the generator are reduced. An appropriate choice of the frequency range is therefore made. If the generator filter operates in a passive manner, it should be designed for this frequency range. The same applies if it is active, in particular if it is formed or supported by a converter or an inverter. In this case, the inverter or converter can be operated accordingly, namely for this frequency range. A corresponding design is nevertheless also advantageous for the inverter or converter. In particular, components such as output inductances can be designed accordingly.

The generator is preferably designed for a sixth harmonic and additionally or alternatively for a twelfth harmonic of an expected or captured mechanical vibration. The sixth and/or twelfth harmonic with respect to a mechanical fundamental vibration is/are therefore reduced. In this respect, it was recognized that such harmonics, in particular, that is to say harmonics from this frequency range, can excite or amplify mechanical vibrations.

It is preferably proposed that an emission feedback unit for feeding back an emission signal to the filter controller is provided. Such an emission signal is representative of an emission output by the generator. A noise emission or an electrical and/or mechanical vibration come(s) into consideration here, in particular. Such a vibration is therefore recorded and is fed back as an emission signal. In this case, precisely that vibration which is ultimately also intended to be reduced can be recorded and fed back as an emission signal.

However, it also comes into consideration to measure other emissions which are representative of the vibrations to be reduced. For example, a vibration at a machine carrier can therefore be recorded, whereas a vibration of the nacelle casing actually causes a high noise emission. In this example, the vibration amplitude at the machine carrier can be considerably lower, but this is possibly a better measuring location in order to arrange a measuring sensor. Arranging a measuring sensor on a strongly vibrating element, such as the nacelle casing in this example, can also be particularly problematic for fastening the sensor. However, it also comes into consideration to capture and evaluate the stator current, for example, and to infer the actual emission on the basis of the evaluation, for example using known properties of the wind turbine, to name just one further example.

For this purpose, it is then proposed to control the generator filter on the basis of the emission signal which has been fed back, in order to reduce the emission output by the generator. The filter controller is configured to do this, which means that it has a corresponding signal input for feeding back the emission signal.

An emission is therefore captured directly or indirectly and the generator filter is then controlled or operated accordingly via the filter controller. It is therefore possible to easily react here to different operating situations. The generator filter needs to be only generally designed for the action area to be generally expected, and the control can then be easily carried out on the basis of the emission signal which was captured. As a result, it can become unnecessary to specifically adapt or capture the instantaneous operating state of the wind turbine. Otherwise, the wind turbine can also be operated substantially as before. Only the filter controller operates in such a manner that it changes the filter properties of the generator filter and adapts them to the respective emission. As a result, it is also particularly easily possible to retrofit this proposed solution in a wind turbine. Substantially only the generator filter, including the filter controller, and a corresponding measuring sensor for capturing the emission signal are required.

Another embodiment proposes that the generator has a plurality of partial generator systems. In particular, provision is made of two three-phase partial stators which each generate a three-phase current, and the generator therefore overall generates a six-phase stator current. A current capture device (i.e., ammeter) is provided for this purpose and is configured to capture the stator current of each partial generator system and to transmit in each case at least one current signal to the filter controller for controlling the generator filter. Such a current signal is respectively representative of the captured stator current. For example, a measurement signal of each stator current can be transmitted. However, it also comes into consideration that the captured stator current has already been evaluated and is transferred to a transformed representation, for example by means of decomposition according to the method of symmetrical components, with the result that at least one vector or phasor for a positive phase-sequence system and for a negative phase-sequence system of each three-phase stator current is transmitted. A current probe or a measuring resistor, for example, can be provided for each phase for the purpose of capturing the stator current.

It is now proposed that the filter controller is configured to control the generator filter on the basis of the current signal. One variant proposes that this is carried out in such a manner that differences between the stator currents are minimized. The stator currents of each partial generator system are therefore compared and the generator filter is then controlled in such a manner that these stator currents conform to one another at least in some properties. The stator currents of each partial generator system are preferably phase-shifted with respect to one another and this phase shift is naturally not intended to be adjusted. However, the amplitude and, in particular, also the harmonic content of each stator current can be adjusted by appropriately controlling the generator filter.

For this purpose, the filter controller can specify corresponding compensating harmonic components which can then be changed or generated by the generator filter. If a converter or an inverter is used as the generator filter in particular, it is possible here to specify a corresponding compensation component for the relevant harmonic component(s).

It also comes into consideration that, in order to adjust the two partial generator systems, the powers output by the partial generator systems are considered and are adjusted by means of the generator filter. It is therefore possible to carry out balancing between the partial generator systems. Owing to the system, such partial generator systems fundamentally generate very similar output signals, in particular stator currents, because they are implemented in the same synchronous generator. Minor differences which occur in this respect can be adjusted by means of the filter controller which controls the generator filter.

It also comes into consideration that the stator currents of the plurality of generator systems, in particular two generator systems, are not directly considered, but rather only their harmonics, and, on the basis of this, these harmonics are adjusted by appropriately controlling the generator filter. The consideration that different harmonic contents of the respective stator current can also have an effect on a different power output of the two partial generator systems also plays a role here. In this case too, the differences should be minor, but may nevertheless be present and become noticeable, for example, in noises or the running behavior of the generator.

Additionally or alternatively, it is proposed that the filter controller is configured to control the generator filter on the basis of the respective current signal in such a manner that differences in the current coverage inside the respective partial generator system are reduced. According to this embodiment, it is therefore proposed that, in particular, the three phases of a stator current of a partial generator system should be considered and, in the event of unbalances which occur between these three phases, the generator filter should be accordingly controlled in such a manner that these unbalances are at least reduced. This balancing inside the partial generator system can also be carried out at the same time as or in combination with the described balancing between the individual partial generator systems.

The configuration of the filter controller also has the appearance here, in particular, that corresponding compensation components are impressed on or added to the stator current in order to obtain the desired balancing. This can be carried out, in particular, by using a converter or an inverter as the generator filter and by virtue of this converter or inverter generating and impressing the corresponding current components.

Therefore, balancing can be respectively carried out in one of the partial generator systems. Deviations between the partial generator systems can also be reduced.

The wind turbine is preferably characterized in that a common DC voltage intermediate circuit for providing an intermediate circuit voltage is provided, a rectifier is provided for the or each stator current in order to rectify the stator current and supply it to the common DC voltage intermediate circuit, the controlled generator filter or a controlled partial filter of the controlled generator filter is arranged between the stator and each rectifier in order to filter the respective stator current, at least one inverter is provided and is connected, on the input side, to the common DC voltage intermediate circuit in order to invert the intermediate circuit voltage into a three-phase current and voltage signal, and wherein the inverter is coupled to an electrical supply network or is configured to feed the three-phase current and voltage signal into the electrical supply network.

A common DC voltage intermediate circuit is therefore proposed, for which the entire stator current is rectified, even when a plurality of partial systems or a plurality of partial stators are provided. The downstream inverter then accesses this common DC voltage intermediate circuit. A controlled partial filter is provided for each stator current.

Another embodiment proposes that a plurality of control characteristic curves are available for controlling the generator. For this purpose, it is proposed that the filter controller is configured to choose between a plurality of control characteristic curves. Each control characteristic curve is in the form of a current characteristic curve in this case and each current characteristic curve indicates a filter setting, in particular a reactive power value, on the basis of the stator current. Depending on the requirements, the corresponding control characteristic curve can therefore be selectively assessed and this then results in a corresponding filter setting being made on the basis of a stator current, in particular in a reactive power value being fed in on the basis of a stator current.

This makes it possible to easily choose between differently dynamic regulators or regulator properties, for example. The control characteristic curves can be chosen, for example, on the basis of an unbalance between individual phases or on the basis of an unbalance between a plurality of partial generator systems. In addition, they can then control the stator-current-dependent reactive power on the basis of an amplitude of the stator current, for example its root mean square value, in particular. However, it also comes into consideration that the control characteristic curve is chosen on the basis of a recorded emission signal. For example, a steeper stator-current-dependent reactive power characteristic curve can be accordingly chosen in the case of a higher emission.

In this respect, the filter controller is configured, in particular, to have a storage (i.e., memory) in which these current characteristic curves are stored. In addition, a processor may be provided for selecting the current characteristic curve stored in this manner, on which processor a corresponding selection criterion is processed.

In particular, different operating points can be set by means of the control characteristic curves.

It is preferably also proposed that different control characteristic curves are provided for different applications. In particular, it is proposed to store, as control characteristic curves, a normal control characteristic curve, a noise control characteristic curve, a homogenization characteristic curve and an inertial characteristic curve, or at least some of these characteristic curves.

In this case, a normal control characteristic curve is a characteristic curve which is provided for the purpose of controlling the generator filter in such a manner that the stator current has as few current harmonics as possible. Such control can be referred to as normal control and the associated characteristic curve can therefore be referred to as a normal control characteristic curve.

A noise control characteristic curve is a characteristic curve which is provided for the purpose of controlling the generator in such a manner that a mechanical vibration or a noise emission of the generator is reduced. The control characteristic curve therefore relates, in particular, to such vibration problems. For this purpose, the noise control characteristic curve may be provided such that it comprises, in particular, a control rule which results in the generator filter being controlled in such a manner that the noises are reduced, in particular. For this purpose, this control characteristic curve can be configured in such a manner that noise-relevant components of the stator current are in the foreground, in particular. This noise control characteristic curve can therefore be specifically designed, for example, in such a manner that harmonics in the region of the sixth or twelfth harmonic with respect to a mechanical fundamental vibration are compensated for or specifically such harmonic components are generated for reduction by the generator filter.

A homogenization characteristic curve is a control characteristic curve which controls the generator filter in such a manner that partial generator systems have a power difference which is as small as possible. Such a homogenization characteristic curve can be provided, in particular, for use for each phase or for each partial generator system and can have a dynamic response or gradient which results in the partial generator systems or the individual phases together finding a stable operating point. In particular, the control characteristic curve can be set in such a manner that the systems do not push one another up in the attempt at balancing. The generator systems have at least a dynamic response, and a control characteristic curve can then form a gain factor or act as a gain actor if, in the simplest case, it is a straight line with a gradient. A more or less vibrating system then results depending on the choice of the gain factor. In addition to known control designs, the practice of testing different control characteristic curves in a simulation also comes into consideration here.

Instead of or in addition to examining a power difference, the homogenization characteristic curve can also be provided for any current differences in the stator current, that is to say is designed in such a manner that the current difference, whether between the partial generator systems or between the phases of one partial generator system in each case, is as small as possible or can be reduced.

An inertial characteristic curve, which can also be synonymously referred to as a characteristic curve for providing an instantaneous reserve, is a characteristic curve which results in or is used for control of the generator filter in such a manner that the generator can achieve a power increase which is as fast as possible. Such an instantaneous reserve situation may be present when a sudden frequency dip requires a short-term higher feed power. This then results in this higher feed power also having to be output by the generator. The generator must then output more power, as a result of which it is decelerated. This power which must be suddenly additionally output by the generator is therefore likewise output via the stator current, and this stator current should accordingly be controlled in such a manner that it is increased, for example by 10%, very quickly, for example within 10 to 50 ms.

Such a fast power increase can also affect the current quality, in particular the harmonics. In addition, it should be noted that the higher power output is associated with deceleration of the generator, which in turn reduces the frequency of the stator current. The inertial characteristic curve is provided for such a situation. Such an inertial characteristic curve is preferably particularly flat, with the result that it intervenes in the control to a rather lesser extent than the other characteristic curves. This is based, in particular, on the knowledge that, in such a situation in which an instantaneous reserve must be provided, this provision of the instantaneous reserve is in the foreground. In addition, such a situation of feeding in the instantaneous reserve is comparatively short, for example in the region of 10 seconds, with the result that resonance cannot be expected in this time in which the frequency of the stator current also changes because a steady-state situation required for this is not present. Therefore, noise problems cannot be expected and, should noise problems nevertheless occur, they would be tolerable for the short period of the inertial situation.

However, the inertial characteristic curve can also be designed such that a particularly high reactive current is fed in in order to thereby increase an excitation in the generator and therefore to additionally also support the increase in the output power. Such an increase in the output power as a result of an accordingly changed stator current can accelerate the power increase in this instantaneous reserve situation.

It has also been recognized for these characteristic curves which have been explained that they can set different operating points.

In particular, it is proposed that the filter controller is configured to change an operating point of the generator. In particular, the filter controller is configured to control the generator filter to change an excitation of the generator. In this respect, measures which already been described above proposed here. It should be noted that such measures, that is to say, in particular, deliberate selection of an operating point, can also be implemented differently than using one of the proposed control characteristic curves. Very generally, it is proposed that an operating point can be set by means of the adjustable generator filter by setting reactive power, that is to say by adding reactive current to the stator current. This can be carried out, in particular, by using an active generator filter, in particular by using a converter or an inverter as the generator filter.

A method for controlling a stator current of a generator of a wind turbine is provided. In this case too, the generator is in the form of a gearless synchronous generator with a stator and a generator rotor. The method at least comprises the steps of filtering at least one stator current of the generator by means of a generator filter connected to the stator of the generator, wherein the generator filter has modifiable filter properties, and controlling the generator filter by means of a filter controller in order to set the filter properties.

In this case and also in the other embodiments, the practice of setting the filter properties can also mean that filter properties are emulated. The embodiment, which has already been described and according to which a current is generated by the generator filter and is impressed on the stator current which behaves as if passive filter is connected, is an example of an emulation of filter properties.

In particular, the method uses a wind turbine according to at least one embodiment described above. The embodiments of a wind turbine which are described above also comprise descriptions of method steps or method properties, for which it has been explained, in particular, that the generator filter and the filter controller are each provided or configured for this. It is proposed that the method can comprise such method steps or method properties according to embodiments.

Provided is a generator filter of a wind turbine for filtering a generator current of a gearless synchronous generator of the wind turbine. Such a generator filter comprises a filter connection for connecting the generator filter to a stator current output of the gearless generator, and the generator filter comprises a filter controller for controlling the generator filter, wherein the generator filter has modifiable filter properties. A generator filter which is configured to be controlled in the manner described according to at least one above-described embodiment of a wind turbine is therefore proposed, in particular.

Overall, a solution which fundamentally helps to improve the operating behavior of a gearless synchronous generator of a wind turbine is proposed as a wind turbine, a generator filter or a method for controlling a stator current. Achieving or assisting with a noise reduction thereby is one of the aspects.

In principle, however, it is also possible to improve the controllability of the generator because the proposed solutions additionally intervene in the control of the generator, namely in addition to directly controlling an excitation current in the generator rotor of the generator. The generation of power can therefore also be improved via this additional control intervention, for example. It is also possible to consider different partial generator systems in a differentiated manner and compensation can be provided in the event of unbalances. The operating point of the generator can also actually be set better overall as a result of the additional intervention.

The so-called inertial situation or instantaneous reserve situation in which an instantaneous reserve is provided from rotational energy can also be specifically addressed, in particular, by the proposed solutions. In particular, the generator power required for this purpose can be quickly provided. Such a power increase can be controlled by increasing the excitation power by directly controlling the excitation power in the generator rotor. In this case, however, the time constants of the generator rotor, in particular, should be heeded for controlling the excitation and such time constants may be, for example, in the range of 1 to 2 seconds, in particular 1 to 1.5 seconds. Such a time can be shortened by means of proposed control of an active generator filter. The power increase caused by controlling the excitation current is intended to be supplemented in this case, in particular. This power can be increased even more quickly, in particular, in which case this increased output power can then be well maintained, however, by increasing the excitation current.

As a result, the solution described above makes it possible, in particular, to achieve a sound reduction, in particular also for a synchronous generator having two three-phase systems. In this case, the balancing of the two partial systems also plays a role, in particular. In addition, the efficiency can be increased. Finally, an output power, in particular, can also be controlled more quickly.

BRIEF DESCRIPTION OF THE SEVERAL VIEWS OF THE DRAWINGS

The invention is described in more detail below, by way of example, on the basis of embodiments with reference to the accompanying figures.

DETAILED DESCRIPTION

Figure 1:
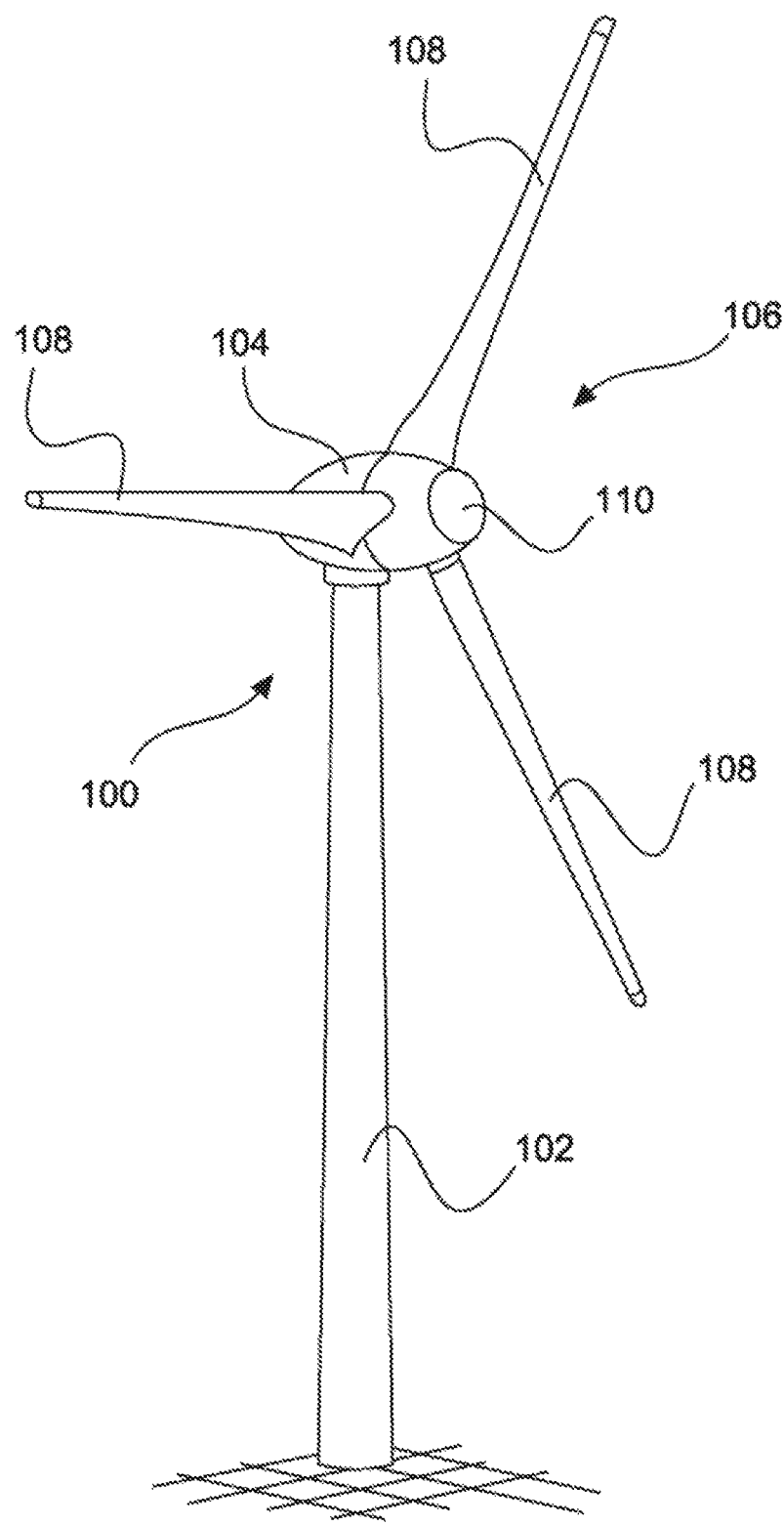
FIG. 1 shows a perspective illustration of a wind turbine.

FIG. 1 shows a wind turbine 100 having a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

Figure 2:
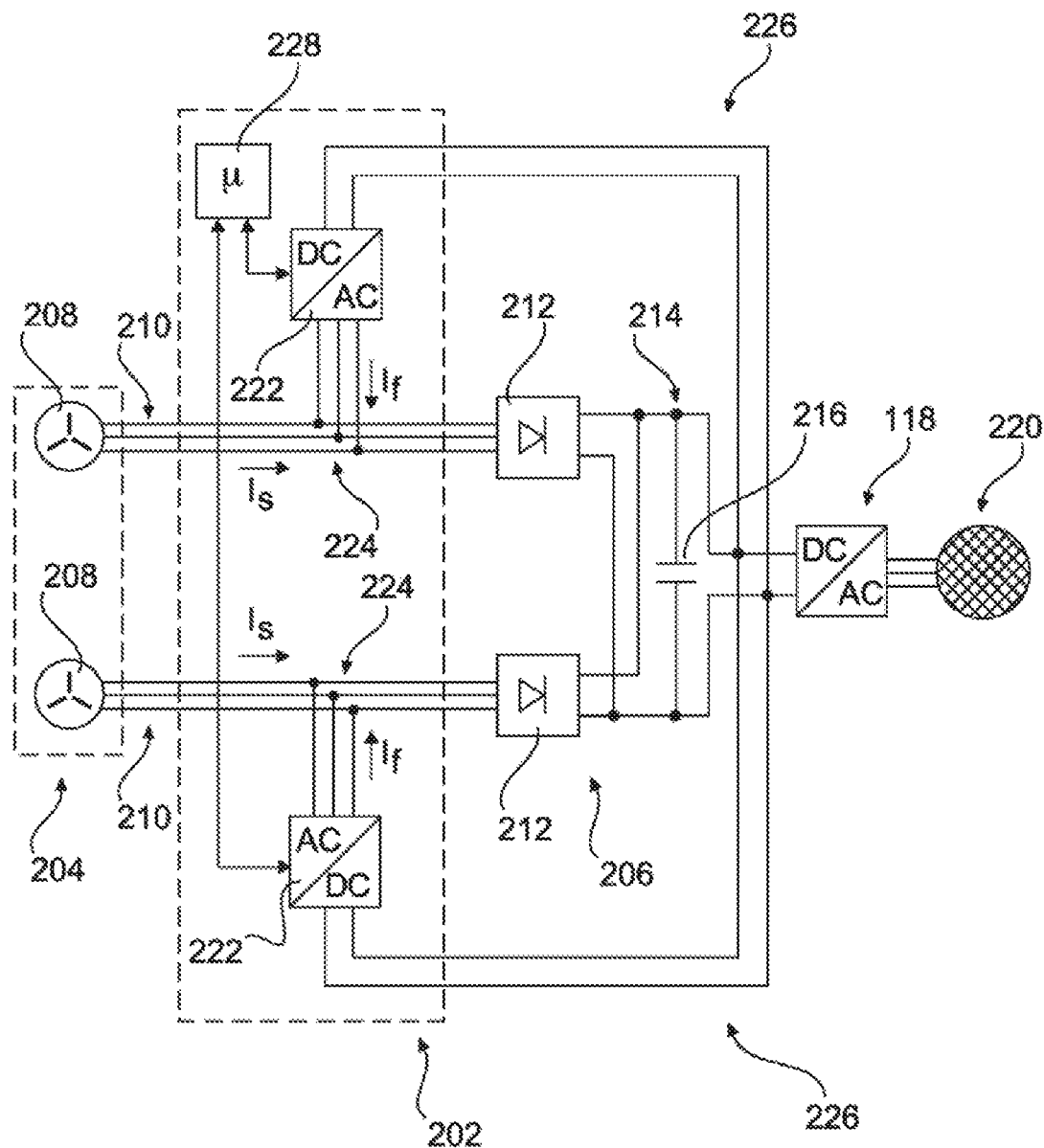
FIGS. 2-4 each show a schematic illustration of a structure of a filter circuit with a generator and a generator filter.

FIG. 2 shows an arrangement 200 which shows, in particular, a generator filter 202 and how this filter is connected to a generator 204 and a rectifier 206.

The arrangement 200 therefore proceeds from a generator 204 which is in the form of a gearless synchronous generator and has two partial stator systems 208. The two partial stator systems 208 which, in this respect, form two partial generator systems are substantially the same but are electrically shifted through 30° with respect to one another. Each of the partial stator systems 208 has a stator current output 210 at which a three-phase stator current $I_S$ is respectively output. Each stator current is represented with an arrow for simplification, in which case each stator current $I_S$ is three-phase, however, and therefore one phase flows in each line in each case.

Each stator current is then rectified in a rectifier 212 of the rectifier 206 in each case. The result here is a common direct current or a common DC voltage which is made available to the DC voltage intermediate circuit 214. The DC voltage intermediate circuit comprises an intermediate circuit capacitor 216 for smoothing and holding its DC voltage. On the basis of the DC voltage from the DC voltage intermediate circuit 214, a network inverter 118 can then generate a desired alternating current and can feed it into the symbolically illustrated electrical supply network 220. The further use of the network 218 for feeding the electrical supply network 220 is not important in detail, in particular, with the result that the illustration is also very simplistic here.

The generator filter 202 now has two filter inverters 222 which each form a partial filter. Each filter inverter 222 is connected to a stator current output 210 in each case and can therefore filter the relevant stator current.

The filtering is then carried out in such a manner that voltages at the stator current output 210 are measured, which can also be carried out in each case by the relevant filter inverter 222. On the basis of this, the filter inverter 222 can then generate a corresponding filter current or a filter voltage and can add it to the stator current $I_S$. A filter current $I_F$ is respectively generated for this purpose and is also three-phase here. Each filter current $I_F$ acts on the respective stator current $I_S$ at the respective filter connection point 224. The filter connection point 224 is fundamentally electrically identical to the respective stator current output 210. The filter current $I_F$ therefore also acts on the generator 204, namely on the respective partial stator system 208.

A reactive power component is preferably at least additionally guided to the filter connection point 224 by means of the filter current $I_F$ and this reactive power component then acts on the relevant partial stator system 208 via the stator current output 210 and therefore influences the generator 204 or its behavior there.

Each filter inverter 222 can be connected to the DC voltage intermediate circuit 214 via a DC connection 226 and can obtain a direct current via said circuit. In this case, each filter inverter 222 may also be provided or operate as a rectifier which is capable of feedback and can feed a direct current into the DC voltage intermediate circuit.

Figure 3:
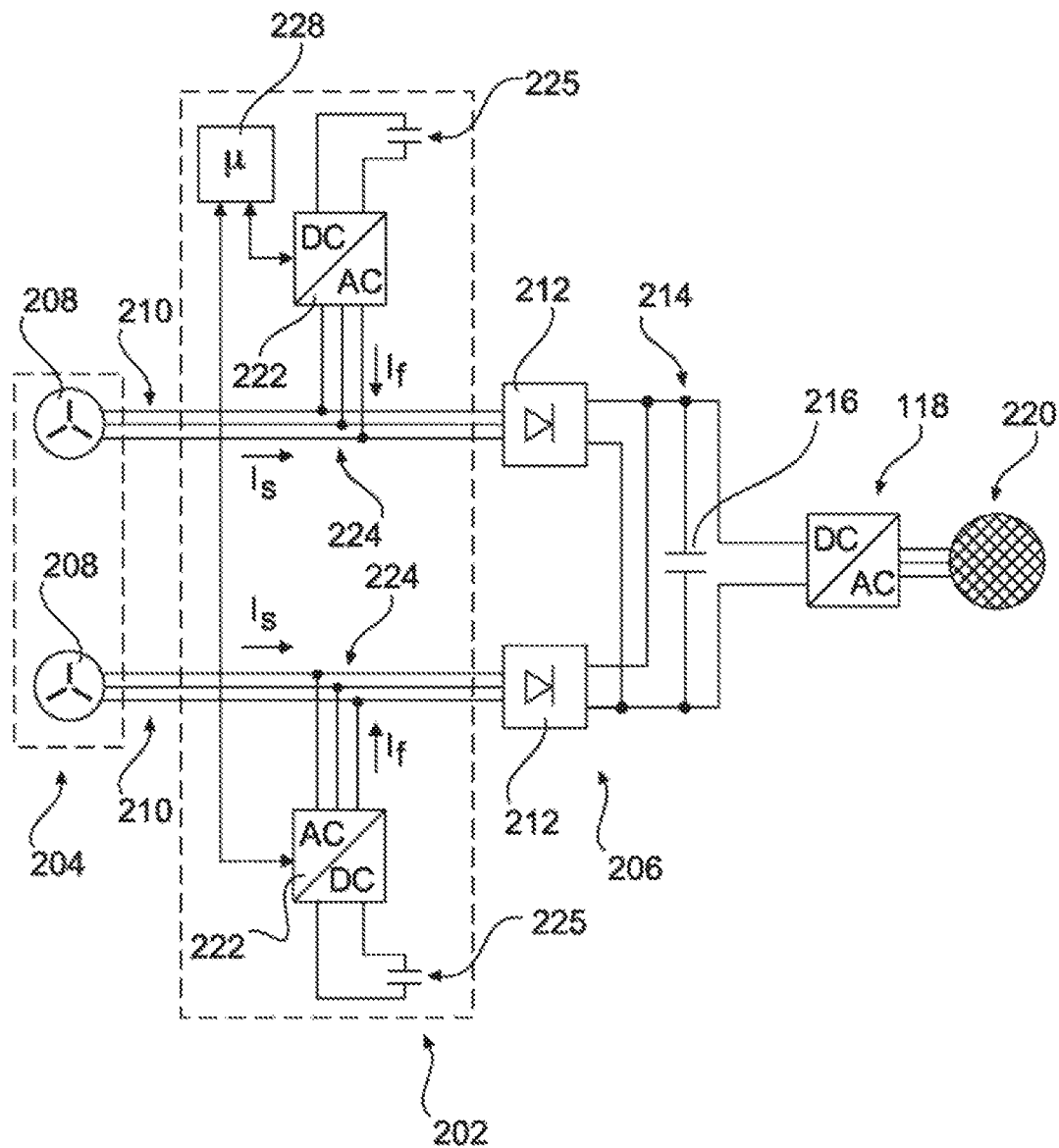

In an alternative, second configuration, instead of the DC connection 226 to the DC voltage intermediate circuit 214, only one capacitance 225 is respectively connected to the DC side of the filter inverter 222 without connecting this capacitance to the DC voltage intermediate circuit. The filter inverter 222 then operates such that it does not supply or discharge any energy on the DC side. The filter inverter 222 operates here such that the filter current $I_F$ does not supply or discharge energy for a relatively long period. For a short period, energy can be buffered in the capacitance connected on the DC side and can be output from said capacitance again. This is shown in FIG. 3 which otherwise corresponds to FIG. 2.

Figure 4:
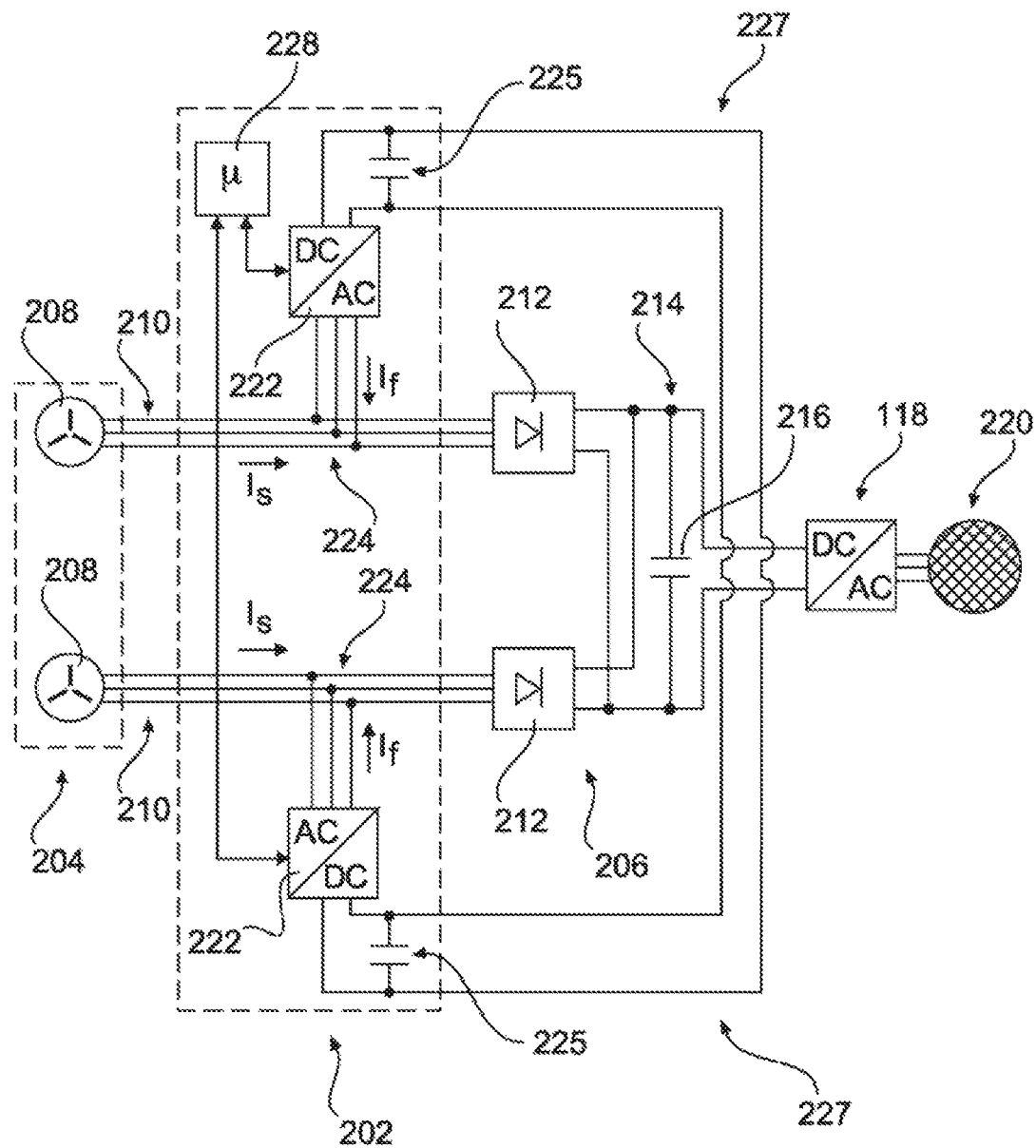

In an alternative, third configuration, instead of the DC connection 226 to the DC voltage intermediate circuit 214, a capacitance 225 is respectively also connected to the DC side of the filter inverter 222, like in the second configuration, without connecting said capacitance to the DC voltage intermediate circuit 214. However, a DC connection 227 between these capacitances 225 of the two filter inverters 222 is proposed, but this connection does not have any contact with the DC voltage intermediate circuit 214. This can be used to possibly compensate for minor unbalances of the two stator currents $I_S$ or of the two partial stator systems 208. This is shown in FIG. 4 which otherwise corresponds to FIG. 2.

A filter controller 228 is provided for the purpose of controlling the generator filter 202 and, in particular, the filter inverters 222, which at least relates to all three configurations. This filter controller 228 communicates with the two filter inverters 222. The filter controller 228 can therefore also control the two filter inverters 222 with respect to one another. Balancing or at least partial adjustment of the two partial stator systems 208 can then be carried out in such a manner that each filter inverter 222 first of all captures, that is to say measures, the respective stator current $I_S$. At the same time, a corresponding output voltage can also be captured here at each stator current output 210.

On the basis of these measurements, each individual filter inverter 222 can be accordingly controlled, on the one hand, and these data can also be passed, on the other hand, to the filter controller 228 for joint and, in particular, also comparative evaluation. The filter controller 228 can then pass appropriate control instructions to the filter inverters 222. In this case, these control instructions may be different between the two filter inverters 222. It also comes into consideration that each filter inverter 222 sometimes carries out independent control or regulation. For this purpose, the filter controller 222 can transmit corresponding control characteristic curves to the respective filter inverter 222.

It also comes into consideration, which is not illustrated in FIG. 2, that further control links are provided, namely, on the one hand, to an excitation controller which controls the excitation current of the generator 204 but also, on the other hand, to an output controller which controls the network inverter 218. Further evaluations and control connections, for example for capturing the DC voltage in the DC voltage intermediate circuit 214, are also proposed according to further embodiments, but are not illustrated in FIG. 2.

It can be seen that the generator filter 202 can act in an extremely flexible manner on account of the fact that it is substantially constructed from two filter inverters 222 and a filter controller 228. As a result, diverse filtering and control is fundamentally possible and can be prepared and controlled by a process computer. This control can then be implemented by means of a filter inverter 222. Such a filter inverter 222 can fundamentally be a conventional inverter which is designed for the corresponding voltage and current values. A tolerance band method is preferably used in order to therefore be able to precisely set the filter current $I_F$.

Effects which occur can therefore also be investigated and control solutions can be planned and can then be easily implemented by appropriately controlling the filter inverters 222.

The invention claimed is:

1. A wind turbine comprising:
a gearless generator, wherein the gearless generator is a synchronous generator and includes a stator and a generator rotor;
a generator filter coupled to the stator and configured to filter a stator current, wherein the generator filter has modifiable filter properties; and
a filter controller configured to control the generator filter,
wherein the gearless generator includes a plurality of partial generator systems;
wherein the wind turbine includes a current capture device configured to:
measure a respective stator current of each partial generator system of the plurality of partial generator systems; and
transmit, for each partial generator system of the plurality of partial generator systems, a respective at least one current signal representative of the respective stator current to the filter controller for controlling the generator filter; and
wherein the filter controller is configured to control the generator filter based on the respective at least one current signal such that differences between stator currents or between output powers of the plurality of partial generator systems are minimized; or
wherein the filter controller is configured to control the generator filter based on the respective at least one current signal such that differences in current coverage in a respective partial generator system are reduced.

2. The wind turbine as claimed in claim 1, wherein the generator filter has capacitive properties that are modifiable for modifying the filter properties.

3. The wind turbine as claimed in claim 1, wherein the generator filter is a converter or an inverter or includes the converter or the inverter.

4. The wind turbine as claimed in claim 1, wherein:
the generator filter is coupled between the stator and a rectifier for rectifying the stator current, or
the generator filter has capacitances connected in series and the stator current flows from the stator through the capacitances to the rectifier, or
the generator filter is configured to emulate the capacitances connected in series.

5. The wind turbine as claimed in claim 1, wherein:
the generator filter is controlled such that the stator current is changed so that the stator current results in a higher output power in the gearless generator, or
the stator current through the generator filter has a capacitive reactive current component that increases the output power.

6. The wind turbine as claimed in claim 1, wherein:
the generator filter is configured to filter the stator current such that mechanical vibration excitations of the gearless generator are reduced, or
the generator filter is configured for a frequency range in order to filter the stator current such that the mechanical vibration excitations of the gearless generator are reduced, or
a sixth or a twelfth harmonic of an expected or captured mechanical vibration is reduced.

7. The wind turbine as claimed in claim 1, comprising:
an emission feedback unit for feeding back an emission signal to the filter controller, wherein:
the emission signal is representative of an emission output by the gearless generator, wherein the emission output is a noise emission, an electrical vibration or mechanical vibration; and
the filter controller is configured to control the generator filter based on the fed back emission signal to reduce the emission output by the gearless generator.

8. The wind turbine as claimed in claim 1, comprising:
a common DC voltage intermediate circuit configured to provide an intermediate circuit voltage;
a rectifier, associated with each stator current, configured to rectify the stator current and supply the rectified stator current to the common DC voltage intermediate circuit, wherein the generator filter or a partial filter of the generator filter is coupled between the stator and each rectifier to filter the respective stator current; and
at least one inverter, having an input coupled to the common DC voltage intermediate circuit, configured to invert the intermediate circuit voltage into a three-phase current and voltage signal, and wherein the at least one inverter has an output coupled to an electrical supply network or the at least one inverter is configured to feed the three-phase current and voltage signal into the electrical supply network.

9. The wind turbine as claimed in claim 1, wherein:
the filter controller is configured to control the gearless generator based on the stator current.

10. The wind turbine as claimed in claim 1, wherein the filter controller is configured to select between an available plurality of control characteristic curves or control rules for controlling the gearless generator.

11. The wind turbine as claimed in claim 10, wherein the filter controller is configured to select a control characteristic curve or control rule from a list including:
- a normal control characteristic curve or a normal control rule for controlling the generator filter such that the stator current has as few current harmonics as possible;
- a noise control characteristic curve or a noise control rule for controlling the generator filter such that a mechanical vibration or noise emission of the gearless generator is reduced;
- a homogenization characteristic curve or a homogenization rule for controlling the generator filter such that the plurality of partial generator systems have a smallest possible current difference in the stator current or a smallest possible power difference between each other; and
- an inertial characteristic curve or an inertial rule for controlling the generator filter such that the gearless generator achieves a power increase as fast as possible.

12. The wind turbine as claimed in claim 1, wherein the filter controller is configured to change an operating point of the gearless generator or control the generator filter to change an output voltage or output power of the gearless generator.

13. A method comprising:
controlling the stator current of the generator of the wind turbine as claimed in claim 1, the controlling comprising:
- filtering, by the generator filter, at least one stator current of the gearless generator; and
- controlling the generator filter by the filter controller to set the filter properties.

14. The wind turbine as claimed in claim 1, wherein the plurality of partial generator systems are two three-phase partial stators that generate a six-phase stator current.

15. The wind turbine as claimed in claim 9, wherein:
the filter controller has at least one current characteristic curve associating a filter setting or reactive power value based on the stator current.

16. The wind turbine as claimed in claim 10, wherein each control characteristic curve of the plurality of control characteristic curves is a current characteristic curve that associates a filter setting or a reactive power value with the stator current.

* * * * *